(12) United States Patent
Buser et al.

(10) Patent No.: US 9,473,760 B2
(45) Date of Patent: Oct. 18, 2016

(54) DISPLAYS FOR THREE-DIMENSIONAL PRINTERS

(71) Applicant: MakerBot Industries, LLC, Brooklyn, NY (US)

(72) Inventors: Anthony James Buser, Reading, PA (US); Ariel Douglas, Brooklyn, NY (US); Jennifer J. Lawton, Fairfield, CT (US); Robert M. McGuire, Baltimore, MD (US); Nathaniel B. Pettis, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 101 days.

(21) Appl. No.: 13/691,230

(22) Filed: Nov. 30, 2012

(65) Prior Publication Data

US 2014/0043630 A1   Feb. 13, 2014

Related U.S. Application Data

(60) Provisional application No. 61/680,989, filed on Aug. 8, 2012, provisional application No. 61/719,874, filed on Oct. 29, 2012.

(51) Int. Cl.
| | | |
|---|---|---|
| *H04N 1/00* | (2006.01) | |
| *G06K 15/02* | (2006.01) | |
| *H04N 13/02* | (2006.01) | |
| *B29C 67/00* | (2006.01) | |

(52) U.S. Cl.
CPC ........... *H04N 13/02* (2013.01); *B29C 67/0055* (2013.01); *G06K 15/02* (2013.01); *H04N 1/00129* (2013.01); *H04N 1/00278* (2013.01); *H04N 13/021* (2013.01); *H04N 13/0239* (2013.01); *H04N 13/0253* (2013.01)

(58) Field of Classification Search
CPC ........... B29C 67/0051; B29C 67/0085; G03F 7/0037
USPC ....... 264/40.1, 401, 113, 308; 425/135, 375, 425/174.4
See application file for complete search history.

(56) References Cited

U.S. PATENT DOCUMENTS

| | | | |
|---|---|---|---|
| 5,545,367 A * | 8/1996 | Bae et al. ...................... 264/401 |
| 6,027,682 A * | 2/2000 | Almquist et al. ............. 264/401 |
| 8,414,280 B2 * | 4/2013 | Pettis ........................ G06F 3/12 264/308 |
| 8,425,218 B2 * | 4/2013 | Pettis ............................ 425/150 |
| 8,562,324 B2 * | 10/2013 | Pettis ............................ 425/150 |
| 8,647,102 B2 * | 2/2014 | Swanson ............. B29C 67/0055 425/162 |
| 8,668,859 B2 * | 3/2014 | Pettis .................. B29C 67/0055 264/308 |
| 2002/0105114 A1 * | 8/2002 | Kubo et al. .................. 264/497 |
| 2002/0155189 A1 * | 10/2002 | John .......................... 425/174.4 |
| 2005/0012246 A1 * | 1/2005 | Yoshino ....................... 264/401 |
| 2005/0074596 A1 * | 4/2005 | Nielsen et al. ............. 428/304.4 |
| 2006/0145381 A1 * | 7/2006 | Larsson ....................... 264/40.6 |
| 2008/0169589 A1 * | 7/2008 | Sperry ................ B29C 67/0096 264/494 |
| 2009/0175977 A1 * | 7/2009 | Kuzusako et al. ......... 425/174.4 |
| 2010/0262272 A1 * | 10/2010 | Shkolnik ............. B29C 67/0088 700/120 |
| 2011/0285060 A1 * | 11/2011 | Yamamoto et al. .......... 264/401 |
| 2012/0018924 A1 * | 1/2012 | Swanson ............. B29C 47/0014 264/401 |
| 2012/0092724 A1 * | 4/2012 | Pettis .......................... 358/1.15 |
| 2013/0295215 A1 * | 11/2013 | Wu et al. ................... 425/174.4 |
| 2013/0313743 A1 * | 11/2013 | Rockhold ................... 264/40.1 |
| 2014/0036455 A1 * | 2/2014 | Napadensky ................. 361/748 |

(Continued)

*Primary Examiner* — Nahida Sultana

(74) *Attorney, Agent, or Firm* — Strategic Patents, P.C.

(57) ABSTRACT

A variety of techniques are disclosed for incorporating displays into three-dimensional printers.

30 Claims, 5 Drawing Sheets

(56) References Cited

U.S. PATENT DOCUMENTS

| | | | |
|---|---|---|---|
| 2014/0044822 A1* | 2/2014 | Mulliken | 425/113 |
| 2014/0117575 A1* | 5/2014 | Kemperle et al. | 264/40.7 |
| 2014/0239554 A1* | 8/2014 | El-Siblani | 264/482 |
| 2014/0265049 A1* | 9/2014 | Burris et al. | 264/497 |
| 2015/0102531 A1* | 4/2015 | El-Siblani et al. | 264/401 |
| 2015/0115504 A1* | 4/2015 | Okamoto et al. | 264/401 |
| 2015/0202805 A1* | 7/2015 | Saruhashi et al. | 264/782 |
| 2015/0224710 A1* | 8/2015 | El-Siblani | 264/482 |

* cited by examiner

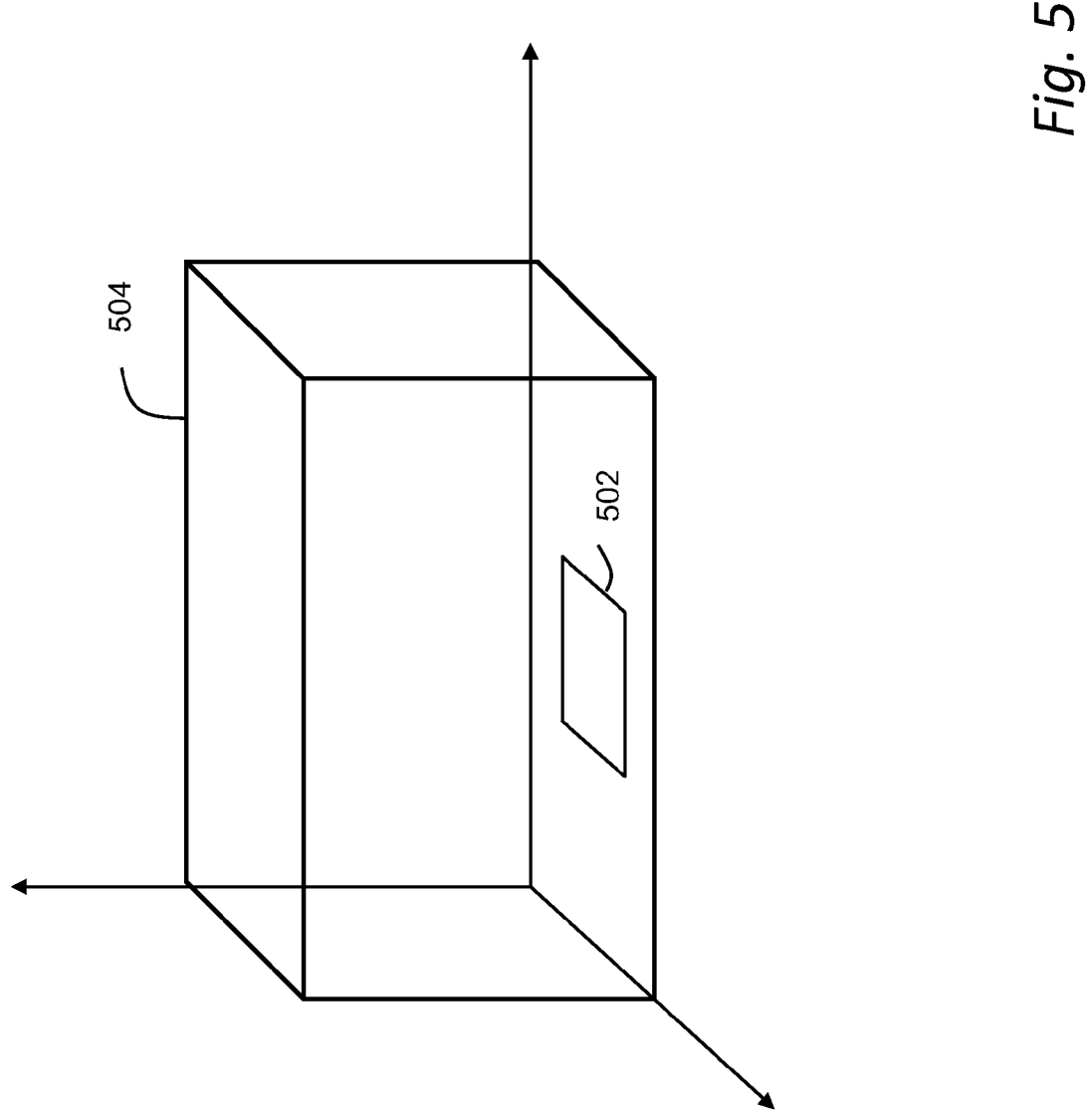

DISPLAYS FOR THREE-DIMENSIONAL PRINTERS

RELATED APPLICATIONS

This application claims the benefit of U.S. Prov. App. No. 61/680,989 filed on Aug. 8, 2012 and U.S. Prov. App. No. 61/719,874 filed on Oct. 29, 2012. The entire content of these applications is incorporated herein by reference.

This application is related to U.S. application Ser. No. 13/314,337 filed on Dec. 8, 2011, the entire content of which is hereby incorporated by reference.

BACKGROUND

There remains a need for techniques to incorporate display devices into three-dimensional printers.

SUMMARY

A variety of techniques are disclosed for incorporating displays into three-dimensional printers.

BRIEF DESCRIPTION OF THE FIGURES

The invention and the following detailed description of certain embodiments thereof may be understood by reference to the following figures:

FIG. 5 shows a horizontal display in a working volume of a three-dimensional printer.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes three-dimensional printers using fused deposition modeling or similar techniques where a bead of material is extruded in a layered series of two dimensional patterns as "roads," "paths" or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer", "three-dimensional printer", "fabrication system", and so forth, unless a more specific meaning is explicitly provided or otherwise clear from the context.

Figure 1:
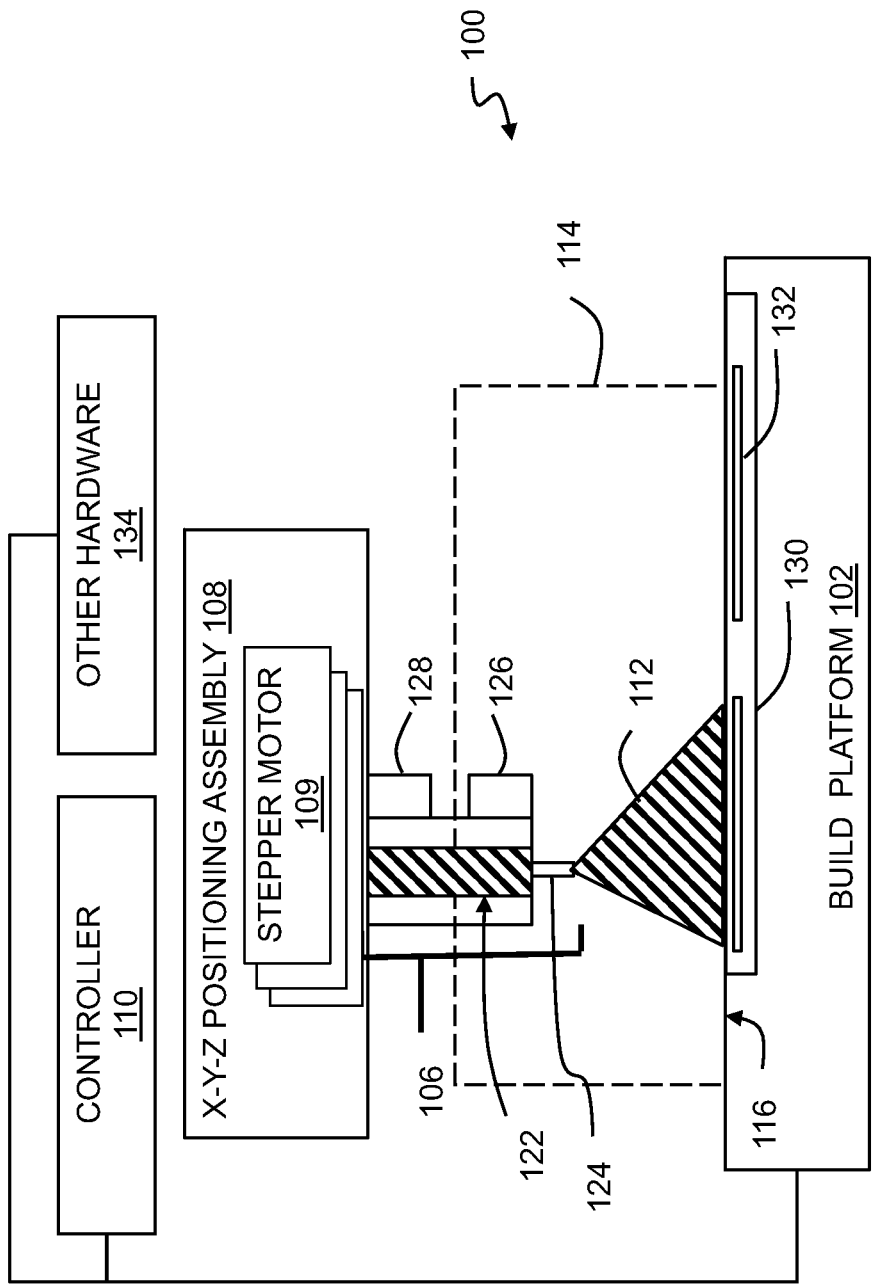
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling affect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 (also referred to as a heating element) to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods by a threaded nut so that the threaded rods can be rotated to provide z-axis positioning of the build platform 102 relative to the extruder 124. This arrangement may advantageously simplify design and improve accuracy by permitting an x-y positioning mechanism for the extruder 124 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, the extruder 126, or any other system components. This may, for example, include a thermistor or the like embedded within or attached below the surface of the build platform 102. This may also or instead include an infrared detector or the like directed at the surface 116 of the build platform 102.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 at a fixed, elevated temperature throughout a build, or the other hardware 134 may include a cooling element to cool the working volume.

Figure 2:
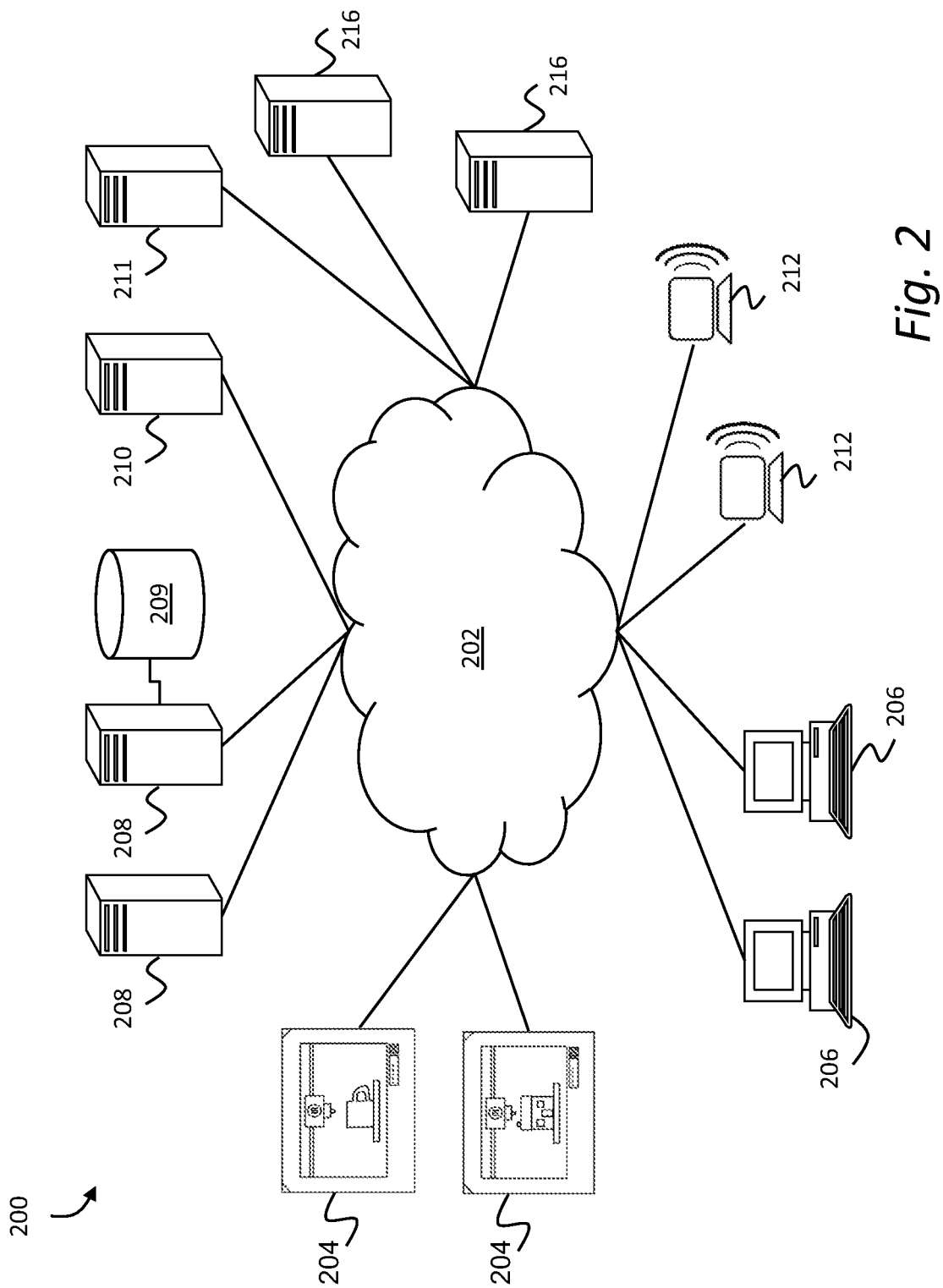
FIG. 2 shows a networked three-dimensional printing environment.

FIG. 2 depicts a networked three-dimensional printing environment. In general, the environment 200 may include a data network 202 interconnecting a plurality of participating devices in a communicating relationship. The participating devices may, for example, include any number of three-dimensional printers 204 (also referred to interchangeably herein as "printers"), client devices 206, print servers 208, content sources 210, mobile devices 212, and other resources 216.

The data network 202 may be any network(s) or inter-network(s) suitable for communicating data and control information among participants in the environment 200. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMax-Advanced (IEEE 802.16m)) and/or other technologies, as well as any of a variety of corporate area or local area networks and other switches, routers, hubs, gateways, and the like that might be used to carry data among participants in the environment 200.

The three-dimensional printers 204 may be any computer-controlled devices for three-dimensional fabrication, including without limitation any of the three-dimensional printers or other fabrication or prototyping devices described above. In general, each such device may include a network interface comprising, e.g., a network interface card, which term is used broadly herein to include any hardware (along with software, firmware, or the like to control operation of same) suitable for establishing and maintaining wired and/or wireless communications. The network interface card may include without limitation wired Ethernet network interface cards ("NICs"), wireless 802.11 networking cards, wireless 802.11 USB devices, or other hardware for wireless local area networking. The network interface may also or instead include cellular network hardware, wide area wireless network hardware or any other hardware for centralized, ad hoc, peer-to-peer, or other radio communications that might be used to carry data. In another aspect, the network interface may include a serial or USB port to directly connect to a computing device such as a desktop computer that, in turn, provides more general network connectivity to the data network 202.

The printers 204 might be made to fabricate any object, practical or otherwise, that is amenable to fabrication according to each printer's capabilities. This may be a model of a house or a tea cup, as depicted, or any other object such as a bunny, gears or other machine hardware, replications of scanned three-dimensional objects, or fanciful works of art.

Client devices 206 may be any devices within the environment 200 operated by users to initiate, manage, monitor, or otherwise interact with print jobs at the three-dimensional printers 204. This may include desktop computers, laptop computers, network computers, tablets, or any other computing device that can participate in the environment 200 as contemplated herein. Each client device 206 generally provides a user interface, which may include a graphical user interface, a text or command line interface, a voice-controlled interface, and/or a gesture-based interface to control operation of remote three-dimensional printers 204. The user interface may be maintained by a locally executing application on one of the client devices 206 that receives data and status information from, e.g., the printers 204 and print servers 208 concerning pending or executing print jobs. The user interface may create a suitable display on the client device 206 for user interaction. In other embodiments, the user interface may be remotely served and presented on one of the client devices 206, such as where a print server 208 or one of the three-dimensional printers 204 includes a web server that provides information through one or more web pages or the like that can be displayed within a web browser or similar client executing on one of the client devices 206. In one aspect, the user interface may include a voice controlled interface that receives spoken commands from a user and/or provides spoken feedback to the user.

The print servers 208 may include data storage, a network interface, and a processor and/or other processing circuitry. In the following description, where the functions or configuration of a print server 208 are described, this is intended to include corresponding functions or configuration (e.g., by programming) of a processor of the print server 208. In general, the print servers 208 (or processors thereof) may perform a variety of processing tasks related to management of networked printing. For example, the print servers 208 may manage print jobs received from one or more of the client devices 206, and provide related supporting functions such as content search and management. A print server 208 may also include a web server that provides web-based access by the client devices 206 to the capabilities of the print server 208. A print server 208 may also communicate periodically with three-dimensional printers 204 in order to obtain status information concerning, e.g., availability of printers and/or the status of particular print jobs, any of which may be subsequently presented to a user through the web server or any other suitable interface. A print server 208 may also maintain a list of available three-dimensional printers 204, and may automatically select one of the three-dimensional printers 204 for a user-submitted print job, or may permit a user to specify a single printer, or a group of preferred printers, for fabricating an object. Where the print server 208 selects the printer automatically, any number of criteria may be used such as geographical proximity, printing capabilities, current print queue, fees (if any) for use of a particular three-dimensional printer 204, and so forth. Where the user specifies criteria, this may similarly include any relevant aspects of three-dimensional printers 204, and may permit use of absolute criteria (e.g., filters) or preferences, which may be weighted preferences or unweighted preferences, any of which may be used by a print server 208 to allocate a print job to a suitable resource.

In one aspect, the print server 208 may be configured to support interactive voice control of one of the printers 204. For example, the print server 208 may be configured to receive a voice signal (e.g., in digitized audio form) from a microphone or other audio input of the printer 204, and to process the voice signal to extract relevant content such as a command for the printer. Where the command is recognized as a print command, the voice signal may be further processed to extract additional context or relevant details. For example, the voice signal may be processed to extract an object identifier that specifies an object for printing, e.g., by filename, file metadata, or semantic content. The voice signal may also be processed to extract a dimensional specification, such as a scale or absolute dimension for an object. The print server 208 may then generate suitable control signals for return to the printer 204 to cause the printer 204 to fabricate the object. Where an error or omission is detected, the print server 208 may return a request for clarification to the printer 204, which may render the request in spoken form through a speaker, or within a user interface of the printer 204 or an associated device.

Other user preferences may be usefully stored at the print server 208 to facilitate autonomous, unsupervised fabrication of content from content sources 210. For example, a print server 208 may store a user's preference on handling objects greater than a build volume of a printer. These preferences may control whether to resize the object, whether to break the object into multiple sub-objects for fabrication, and whether to transmit multiple sub-objects to a single printer or multiple printers. In addition, user preferences or requirements may be stored, such as multi-color printing capability, build material options and capabilities, and so forth. More generally, a print queue (which may be a printer-specific or user-specific queue, and which may be hosted at a printer 204, a server 208, or some combination of these) may be managed by a print server 208 according to one or more criteria from a remote user requesting a print job. The print server 208 may also store user preferences or criteria for filtering content, e.g., for automatic printing or other handling. While this is described below as a feature for autonomous operation of a printer (such as a printer that locally subscribes to a syndicated model source), any criteria that can be used to identify models of potential interest by explicit type (e.g., labeled in model metadata), implicit type (e.g., determined based on analysis of the model), source, and so forth, may be provided to the print server 208 and used to automatically direct new content to one or more user-specified ones of the three-dimensional printers 204.

In the context of voice-controlled printing, the print server 208 may usefully store user-specific data such as training for a voice recognition model. The print server 208 may also or instead store voice rendering data to use in generating spoken output by the printer 204. This may, for example, include voice type data, voice model data, voice sample data, and so forth. Thus for example, a user may purchase or otherwise obtain a voice style (e.g., a celebrity voice or other personality) to render spoken commands and maintain the voice style on the print server 208. The print server 208 may also or instead store data characterizing capabilities of the printer 204 so that voice commands received at the print server 208 can be analyzed for suitability, accuracy, and so forth according to the capabilities of the printer 204 from which the voice command was received. More generally, any data or processing for voice interaction that can be usefully stored or executed remotely from the printer 204 may be located at the printer server 208. It will be understood that any such data may also or instead be stored on a client device, a printer 204, or some combination of these.

In one aspect, the processor of the print server may be configured to store a plurality of print jobs submitted to the web server in a log and to provide an analysis of print activity based on the log. This may include any type of analysis that might be useful to participants in the environment 200. For example, the analysis may include tracking of the popularity of particular objects, or of particular content sources. The analysis may include tracking of which three-dimensional printers 204 are most popular or least popular, or related statistics such as the average backlog of pending print jobs at a number of the three-dimensional printers 204. The analysis may include success of a particular printer in fabricating a particular model or of a particular printer in completing print jobs generally. More generally, any statistics or data may be obtained, and any analysis may be performed, that might be useful to users (e.g., when requesting prints), content sources (e.g., when choosing new printable objects for publication), providers of fabrication resources (e.g., when setting fees), or network facilitators such as the print servers 208.

A print server 208 may also maintain a database 209 of content, along with an interface for users at client devices 206 to search the database 209 and request fabrication of objects in the database 209 using any of the three-dimensional printers 204. Thus in one aspect, a print server 208 (or any system including the print server 208) may include a database 209 of three-dimensional models, and the print server 208 may act as a server that provides a search engine for locating a particular three-dimensional model in the database 209. The search engine may be a text-based search engine using keyword text queries, plain language queries, and so forth. The search engine may also or instead include an image-based search engine configured to identify three-dimensional models similar to a two-dimensional or three-dimensional image provide by a user.

In another aspect, the printer server 208 may periodically search for suitable content at remote locations on the data network, which content may be retrieved to the database 209, or have its remote location (e.g., a URL or other network location identifier) stored in the database 209. In another aspect, the print server 208 may provide an interface for submission of objects from remote users, along with any suitable metadata such as a title, tags, creator information, descriptive narrative, pictures, recommended printer settings, and so forth. In one aspect, the database 209 may be manually curated according to any desired standards. In another aspect, printable objects in the database 209 may be manually or automatically annotated according to content type, popularity, editorial commentary, and so forth.

The print server 208 may more generally provide a variety of management functions. For example, the print server 204 may store a location of a predetermined alternative three-dimensional printer to execute a print job from a remote user in the event of a failure by the one of the plurality of three-dimensional printers 204. In another aspect, the print server 208 may maintain exclusive control over at least one of the plurality of three-dimensional printers 204, such that other users and/or print servers cannot control the printer. In another aspect, the print server 208 may submit a print job to a first available one of the plurality of three-dimensional printers 204.

In another aspect, a print server 208 may provide an interface for managing subscriptions to sources of content. This may include tools for searching existing subscriptions, locating or specifying new sources, subscribing to sources of content, and so forth. In one aspect, a print server 208 may manage subscriptions and automatically direct new content from these subscriptions to a three-dimensional printer 204 according to any user-specified criteria. Thus while it is contemplated that a three-dimensional printer 204 may autonomously subscribe to sources of content through a network interface and receive new content directly from such sources, it is also contemplated that this feature may be maintained through a remote resource such as a print server 208.

A print server 208 may maintain print queues for participating three-dimensional printers 204. This approach may advantageously alleviate backlogs at individual printers 204, which may have limited memory capacity for pending print jobs. More generally, a print server 208 may, by communicating with multiple three-dimensional printers 204, obtain a view of utilization of multiple networked resources that permits a more efficient allocation of print jobs than would be possible through simple point-to-point communications among users and printers. Print queues may also be published by a print server 208 so that users can view pending queues for a variety of different three-dimensional printers 204 prior to selecting a resource for a print job. In one aspect, the print queue may be published as a number of print jobs and size of print jobs so that a requester can evaluate likely delays. In another aspect, the print queue may be published as an estimated time until a newly submitted print job can be initiated.

In one aspect, the print queue of one of the print servers 208 may include one or more print jobs for one of the plurality of three-dimensional printers 204. The print queue may be stored locally at the one of the plurality of three-dimensional printers. In another aspect, the print queue may be allocated between the database 209 and a local memory of the three-dimensional printer 204. In another aspect, the print queue may be stored, for example, in the database 209 of the print server 208. As used here, the term 'print queue' is intended to include print data (e.g., the three-dimensional model or tool instructions to fabricate an object) for a number of print job (which may be arranged for presentation in order of expected execution), as well as any metadata concerning print jobs. Thus, a portion of the print queue such as the metadata (e.g., size, status, time to completion) may be usefully communicated to a print server 208 for sharing among users while another portion of the print queue such as the model data may be stored at a printer in preparation for execution of a print job.

Print queues may implement various user preferences on prioritization. For example, for a commercial enterprise, longer print jobs may be deferred for after normal hours of operation (e.g., after 5:00 p.m.), while shorter print jobs may be executed first if they can be completed before the end of a business day. In this manner, objects can be identified and fabricated from within the print queue in a manner that permits as many objects as possible to be fabricated before a predetermined closing time. Similarly, commercial providers of fabrication services may charge explicitly for prioritized fabrication, and implement this prioritization by prioritizing print queues in a corresponding fashion.

In another aspect, a print server 208 may provide a virtual workspace for a user. In this virtual workspace, a user may search local or remote databases of printable objects, save objects of interest (or links thereto), manage pending prints, specify preferences for receiving status updates (e.g., by electronic mail or SMS text), manage subscriptions to content, search for new subscription sources, and so forth. In one aspect, the virtual workspace may be, or may include, web-based design tools or a web-based design interface that permits a user to create and modify models. In one aspect, the virtual workspace may be deployed on the web, while permitting direct fabrication of a model developed within that environment on a user-specified one of the three-dimensional printers 204, thus enabling a web-based design environment that is directly coupled to one or more fabrication resources.

The content sources 210 may include any sources of content for fabrication with a three-dimensional printer 204. This may, for example, include databases of objects accessible through a web interface or application programming interface. This may also or instead include individual desktop computers or the like configured as a server for hosted access, or configured to operate as a peer in a peer-to-peer network. This may also or instead include content subscription services, which may be made available in an unrestricted fashion, or may be made available on a paid subscription basis, or on an authenticated basis based upon some other relationship (e.g., purchase of a related product or a ticket to an event). It will be readily appreciated that any number of content providers may serve as content sources 210 as contemplated herein. By way of non-limiting example, the content sources 210 may include destinations such as amusement parks, museums, theaters, performance venues, or the like, any of which may provide content related to users who purchase tickets. The content sources 210 may include manufacturers such as automobile, computer, consumer electronics, or home appliance manufacturers, any of which may provide content related to upgrades, maintenance, repair, or other support of existing products that have been purchased. The content sources 210 may include artists or other creative enterprises that sell various works of interest. The content sources 210 may include engineering or architectural firms that provide marketing or advertising pieces to existing or prospective customers. The content sources 210 may include marketing or advertising firms that provide promotional items for clients. More generally, the content sources 210 may be any individual or enterprise that provides single or serial objects for fabrication by the three-dimensional printers 204 described herein.

One or more web servers 211 may provide web-based access to and from any of the other participants in the environment 200. While depicted as a separate network entity, it will be readily appreciated that a web server 211 may be logically or physically associated with one of the other devices described herein, and may, for example, provide a user interface for web access to one of the three-dimensional printers 204, one of the print servers 208 (or databases 209 coupled thereto), one of the content sources 210, or any of the other resources 216 described below in a manner that permits user interaction through the data network 202, e.g., from a client device 206 or mobile device 212.

The mobile devices 212 may be any form of mobile device, such as any wireless, battery-powered device, that might be used to interact with the networked printing environment 200. The mobile devices 212 may, for example, include laptop computers, tablets, thin client network computers, portable digital assistants, messaging devices, cellular phones, smart phones, portable media or entertainment devices, and so forth. In general, mobile devices 212 may be operated by users for a variety of user-oriented functions such as to locate printable objects, to submit objects for printing, to monitor a personally owned printer, and/or to monitor a pending print job. A mobile device 212 may include location awareness technology such as Global Positioning System ("GPS"), which may obtain information that can be usefully integrated into a printing operation in a variety of ways. For example, a user may select an object for printing and submit a model of the object to a print server, such as any of the print servers described above. The print server may determine a location of the mobile device 212 initiating the print job and locate a closest printer for fabrication of the object.

In another aspect, a printing function may be location-based, using the GPS input (or cellular network triangulation, proximity detection, or any other suitable location detection techniques). For example, a user may be authorized to print a model only when the user is near a location (e.g., within a geo-fenced area or otherwise proximal to a location), or only after a user has visited a location. Thus a user may be provided with printable content based upon locations that the user has visited, or while within a certain venue such as an amusement park, museum, theater, sports arena, hotel, or the like. Similarly, a matrix barcode such as a QR code may be employed for localization.

The other resources 216 may include any other software or hardware resources that may be usefully employed in networked printing applications as contemplated herein. For example, the other resources 216 may include payment processing servers or platforms used to authorize payment for content subscriptions, content purchases, or printing resources. As another example, the other resources 216 may include social networking platforms that may be used, e.g., to share three-dimensional models and/or fabrication results according to a user's social graph. In another aspect, the other resources 216 may include certificate servers or other security resources for third party verification of identity, encryption or decryption of three-dimensional models, and so forth. In another aspect, the other resources 216 may include online tools for three-dimensional design or modeling, as well as databases of objects, surface textures, build supplies, and so forth. In another aspect, the other resources 216 may include a desktop computer or the like co-located (e.g., on the same local area network with, or directly coupled to through a serial or USB cable) with one of the three-dimensional printers 204. In this case, the other resource 216 may provide supplemental functions for the three-dimensional printer 204 in a networked printing context such as maintaining a print queue or operating a web server for remote interaction with the three-dimensional printer 204. Other resources 216 also include supplemental resources such as three-dimensional scanners, cameras, and post-processing/finishing machines or resources. More generally, any resource that might be usefully integrated into a networked printing environment may be one of the resources 216 as contemplated herein.

It will be readily appreciated that the various components of the networked printing environment 200 described above may be arranged and configured to support networked printing in a variety of ways. For example, in one aspect there is disclosed herein a networked computer with a print server and a web interface to support networked three-dimensional printing. This device may include a print server, a database, and a web server as discussed above. The print server may be coupled through a data network to a plurality of three-dimensional printers and configured to receive status information from one or more sensors for each one of the plurality of three-dimensional printers. The print server may be further configured to manage a print queue for each one of the plurality of three-dimensional printers. The database may be coupled in a communicating relationship with the print server and configured to store print queue data and status information for each one of the plurality of three-dimensional printers. The web server may be configured to provide a user interface over the data network to a remote user, the user interface adapted to present the status information and the print queue data for one or more of the plurality of three-dimensional printers to the user and the user interface adapted to receive a print job from the remote user for one of the plurality of three-dimensional printers.

The three-dimensional printer 204 described above may be configured to autonomously subscribe to syndicated content sources and periodically receive and print objects from those sources. Thus in one aspect there is disclosed herein a device including any of the three-dimensional printers described above; a network interface; and a processor (which may without limitation include the controller for the printer). The processor may be configured to subscribe to a plurality of sources of content (such as the content sources 210 described above) selected by a user for fabrication by the three-dimensional printer through the network interface. The processor may be further configured to receive one or more three-dimensional models from the plurality of content sources 210, and to select one of the one or more three-dimensional models for fabrication by the three-dimensional printer 204 according to a user preference for prioritization. The user preference may, for example, preferentially prioritize particular content sources 210, or particular types of content (e.g., tools, games, artwork, upgrade parts, or content related to a particular interest of the user).

The memory of a three-dimensional printer 204 may be configured to store a queue of one or more additional three-dimensional models not selected for immediate fabrication. The processor may be programmed to periodically re-order or otherwise alter the queue according to pre-determined criteria or manual user input. For example, the processor may be configured to evaluate a new three-dimensional model based upon a user preference for prioritization, and to place the new three-dimensional model at a corresponding position in the queue. The processor may also or instead be configured to retrieve content from one of the content sources 210 by providing authorization credentials for the user, which may be stored at the three-dimensional printer or otherwise accessible for presentation to the content source 210. The processor may be configured to retrieve content from at least one of the plurality of content sources 210 by authorizing a payment from the user to a content provider. The processor may be configured to search a second group of sources of content (such as any of the content sources 210 described above) according to one or more search criteria provide by a user. This may also or instead include demographic information for the user, contextual information for the user, or any other implicit or explicit user information.

In another aspect, there is disclosed herein a system for managing subscriptions to three-dimensional content sources such as any of the content sources 210 described above. The system may include a web server configured to provide a user interface over a data network, which user interface is adapted to receive user preferences from a user including a subscription to a plurality of sources of a plurality of three-dimensional models, a prioritization of content from the plurality of sources, and an identification of one or more fabrication resources coupled to the data network and suitable for fabricating objects from the plurality of three-dimensional models. The system may also include a database to store the user preferences, and to receive and store the plurality of three-dimensional models as they are issued by the plurality of sources. The system may include a processor (e.g., of a print server 208, or alternatively of a client device 206 interacting with the print server 208) configured to select one of the plurality of three-dimensional models for fabrication based upon the prioritization. The system may include a print server configured to communicate with the one or more fabrication resources through the data network, to determine an availability of the one or more fabrication resources, and to transmit the selected one of the plurality of three-dimensional models to one of the one or more fabrication resources.

In another aspect, there is disclosed herein a network of three-dimensional printing resources comprising a plurality of three-dimensional printers, each one of the plurality of three-dimensional printers including a network interface; a server configured to manage execution of a plurality of print jobs by the plurality of three-dimensional printers; and a data network that couples the server and the plurality of three-dimensional printers in a communicating relationship.

In general as described above, the server may include a web-based user interface configured for a user to submit a new print job to the server and to monitor progress of the new print job. The web-based user interface may permit video monitoring of each one of the plurality of three-dimensional printers, or otherwise provide information useful to a remote user including image-based, simulation-based, textual-based or other information concerning status of a current print. The web-based user interface may include voice input and/or output for network-based voice control of a printer.

The fabrication resources may, for example, include any of the three-dimensional printers 204 described above. One or more of the fabrication resources may be a private fabrication resource secured with a credential-based access system. The user may provide, as a user preference and prior to use of the private fabrication resource, credentials for accessing the private fabrication resource. In another aspect, the one or more fabrication resources may include a commercial fabrication resource. In this case the user may provide an authorization to pay for use of the commercial fabrication resource in the form of a user preference prior to use of the commercial fabrication resource.

Many current three-dimensional printers require significant manufacturing time to fabricate an object. At the same time, certain printers may include a tool or system to enable multiple, sequential object prints without human supervision or intervention, such as a conveyor belt. In this context, prioritizing content may be particularly important to prevent crowding out of limited fabrication resources with low priority content that arrives periodically for autonomous fabrication. As a significant advantage, the systems and methods described herein permit prioritization using a variety of user-specified criteria, and permit use of multiple fabrication resources in appropriate circumstances. Thus prioritizing content as contemplated herein may include any useful form of prioritization. For example, this may include prioritizing the content according to source. The content sources 210 may have an explicit type that specifies the nature of the source (e.g., commercial or paid content, promotional content, product support content, non-commercial) or the type of content provided (e.g., automotive, consumer electronics, radio control hobbyist, contest prizes, and so forth). Prioritizing content may include prioritizing the content according to this type. The three-dimensional models themselves may also or instead include a type (e.g., tool, game, home, art, jewelry, replacement part, upgrade part, etc.) or any other metadata, and prioritizing the content may includes prioritizing the content according to this type and/or metadata.

In one aspect, the processor may be configured to select two or more of the plurality of three-dimensional models for concurrent fabrication by two or more of the plurality of fabrication resources based upon the prioritization when a priority of the two or more of the plurality of three-dimensional models exceeds a predetermined threshold. That is, where particular models individually have a priority above the predetermined threshold, multiple fabrication resources may be located and employed to fabricate these models concurrently. The predetermined threshold may be evaluated for each model individually, or for all of the models collectively such as on an aggregate or average basis.

In one aspect, the processor may be configured to adjust prioritization based upon a history of fabrication when a number of objects fabricated from one of the plurality of sources exceeds a predetermined threshold. Thus, for example, a user may limit the number of objects fabricated from a particular source, giving subsequent priority to content from other sources regardless of an objectively determined priority for a new object from the particular source. This prevents a single source from overwhelming a single fabrication resource, such as a personal three-dimensional printer operated by the user, in a manner that crowds out other content from other sources of possible interest. At the same time, this may enable content sources 210 to publish on any convenient schedule, without regard to whether and how subscribers will be able to fabricate objects.

In another aspect, the processor may be configured to identify one or more additional sources of content based upon a similarity to one of the plurality of sources of content. For example, where a content source 210 is an automotive manufacturer, the processor may perform a search for other automotive manufactures, related parts suppliers, mechanics, and so forth. The processor may also or instead be configured to identify one or more additional sources of content based upon a social graph of the user. This may, for example, include analyzing a social graph of relationships from the user to identify groups with common interests, shared professions, a shared history of schools or places of employment, or a common current or previous residence location, any of which may be used to locate other sources of content that may be of interest to the user.

Figure 3:
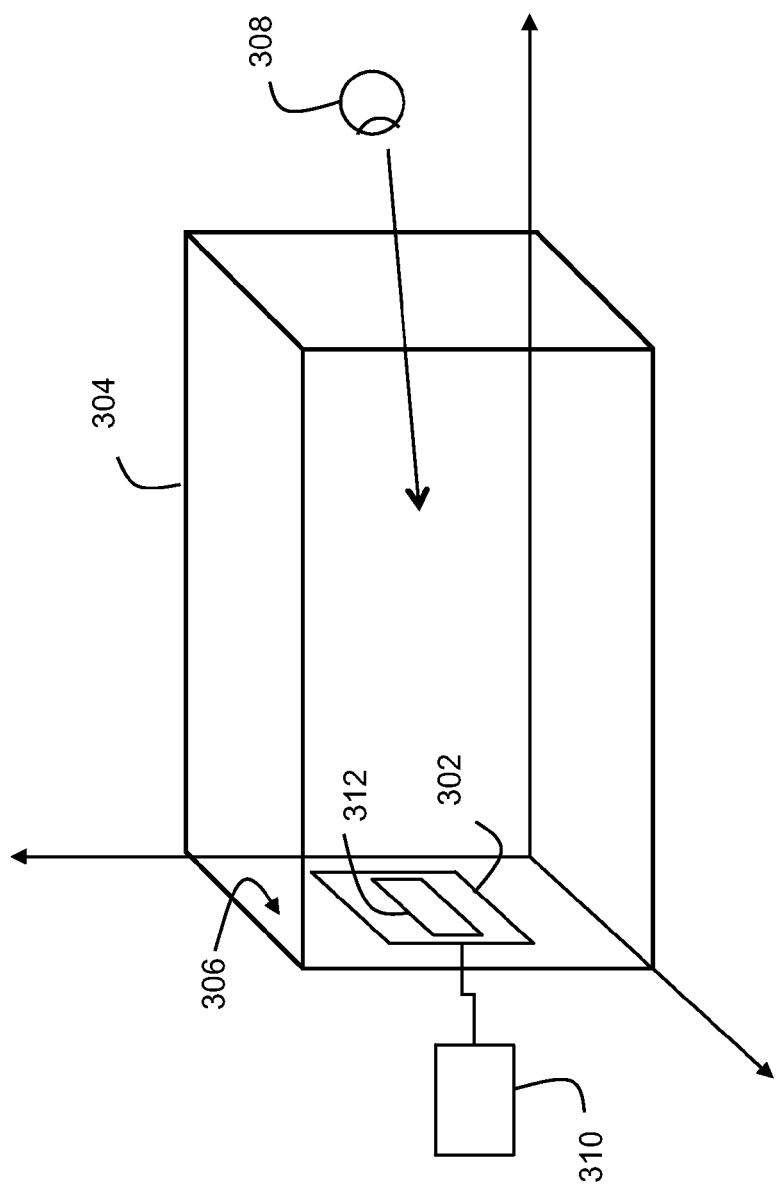
FIG. 3 shows a vertical display in a working volume of a three-dimensional printer.

FIG. 3 shows a vertical display in a working volume of a three-dimensional printer. In general a display 302 may be positioned within a working volume 304 of a three-dimensional printer (not shown), and positioned for example vertically and adjacent to or near a side 306 of the working volume 304, with an active portion of the display 302 facing the working volume 304. In this manner, the display 302 may be visible through the working volume 304, such as from an opposing side of the working volume 304 at a location 308 outside the working volume 308.

The display 302 may include any suitable components for displaying visual data in two or three dimensions including without limitation commonly available display technologies such as a cathode ray tube, a light emitting diode (LED) display, a liquid crystal display (LCD), or any other display using any other display technology as well as combinations of the foregoing. In one aspect, the display 302 may be a surface that receives a projection, in which case the surface may include any coating necessary or desired to obtain a suitably visible display area within or adjacent to the working volume 304. It will also be appreciated that the display 302 may be hardware integrated into a three-dimensional printer, or the display 302 may be a modular display or a computing device with a display (such as a tablet or other mobile computing device) that is positioned as illustrated in the figure and coupled in a communicating relationship with a remote processor to display desired visual information on a screen thereof. In general, the display 302 may be a touch screen or the like that provides a user interface permitting direct, touch-based user interactions. All such combinations that can yield a controllable display surface in the desired position and orientation relative to the working volume may serve as the display 302 contemplated herein.

In one aspect, the display 302 may be vertically oriented as described above. The display 302 may also be positioned on a back panel of an enclosure, where for example a front of the enclosure is on the right side of the working volume 304 depicted in FIG. 3, and the back panel of the enclosure is on the left side of the working volume 304 as depicted in FIG. 3. The display 302 may instead be positioned away from and parallel with a back panel, and immediately adjacent to the working volume 304, or in any other suitable position. AS noted above, the enclosure may be omitted in its entirety, or may not have a back panel, in which case the display 302 may be positioned in any suitable location facing the working volume 304 and visible from a front of the printer.

In general, a processor 310, such as a processor, controller, or other control circuitry of the three-dimensional printer, may be coupled in a communicating relationship with the display 302 and configured to display information on the display 302 related to operation of the three-dimensional printer.

The display 302 may generally display information 312 related to a three-dimensional printer, an object being fabricated, and/or a user of the three-dimensional printer, and so forth. This may include text, graphics, animations, images, video, web content, simulations, renderings of three-dimensional models, and so forth. Various types of information 312 that might be usefully presented in the display 302 are discussed later in this document by way of non-limiting examples.

Figure 4:
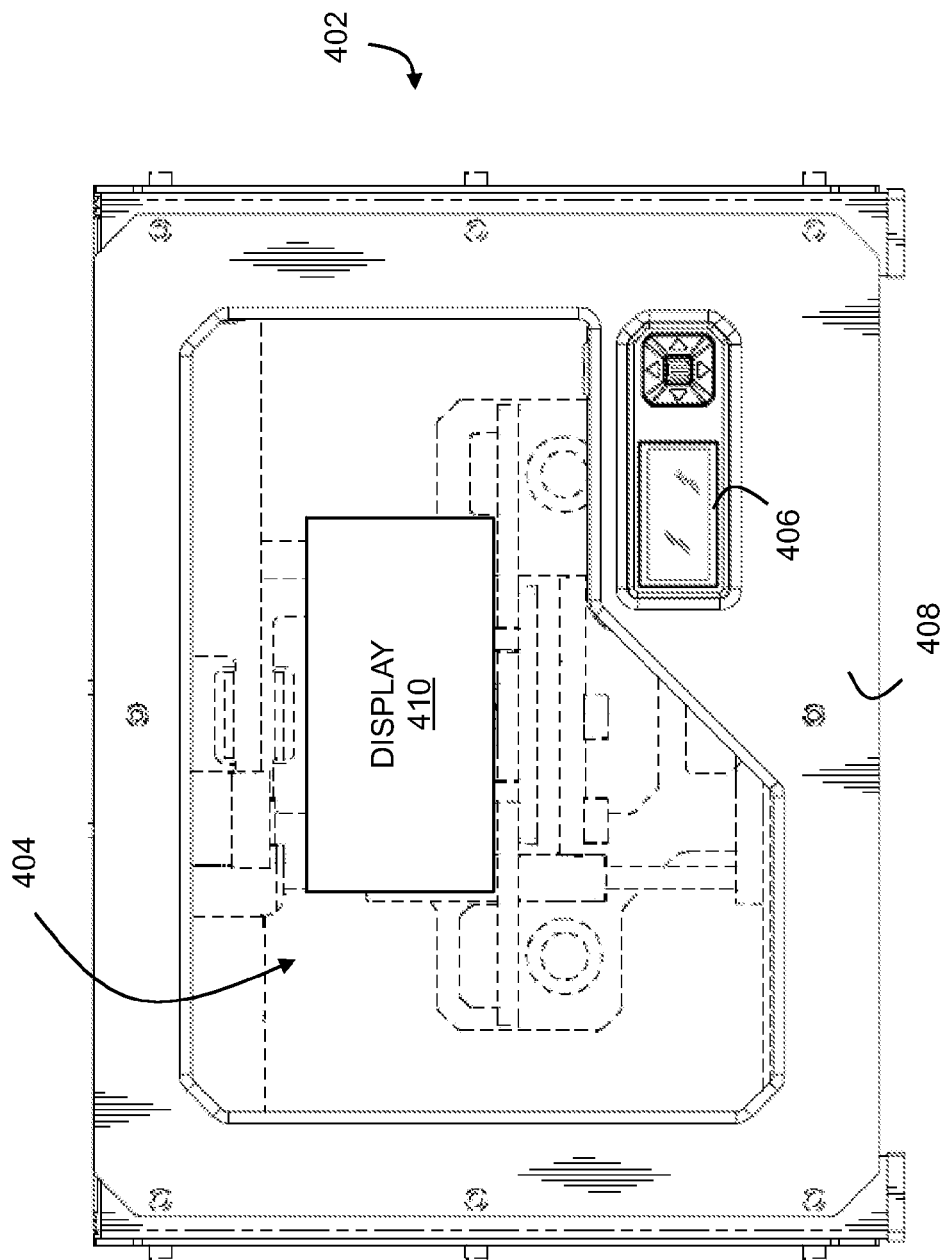
FIG. 4 shows an enclosure for a three-dimensional printer.

FIG. 4 shows an enclosure 402 for a three-dimensional printer. In general, the enclosure 402 may wholly or partially enclose the working volume and/or other components of a three-dimensional printer for a variety of reasons including thermal control, noise mitigation, safety, and so forth. The enclosure 402 may include one or more openings for visual and physical access to a working volume and other components of the three-dimensional printer. In one aspect, the enclosure 402 may be minimized or omitted so that the printer operates in free, unenclosed space with the working volume accessible freely from all directions except where obstructed by various other components of the printer. In another aspect, the enclosure 402 may substantially enclose the printer on six sides to form the printer into a substantially rectangular prism.

In addition to an interior display facing the working volume as described above, the printer may include a display 406 on an exterior of the enclosure 402 and facing away from the working volume to provide a conventional control panel for the printer.

In one aspect, the enclosure 402 may include a front panel 408 with an opening 404 for visual and physical access to the working volume. A display 410 may be positioned within the enclosure 402, e.g., adjacent to a rear panel of the enclosure 402, and oriented so that a display surface of the display 410 is visible through the opening 404 in the front panel 408. That is, the display 410 may be on a back side of the working volume and/or the enclosure as viewed from the front in FIG. 4 and visible from the front through the opening 404 in the front panel 408.

FIG. 5 shows a horizontal display in a working volume of a three-dimensional printer. In general, a display 502 may be oriented horizontally with a display surface facing upwards toward a working volume 504. In this orientation, the display 502 may be positioned for use as a build platform in the working volume 504, such that build material can be deposited by a printer directly on to the display 502. In order to facilitate use as a build platform, the display 502 may be removably and replaceably coupled to a z-axis positioning assembly of a three-dimensional printer using, e.g., clips, screws, pins, or any other suitable retaining mechanism to removably and replaceably secure the display 502 in position as a build platform. It will be understood that a printer as contemplated herein may include both a horizontal display and a vertical display, which may be used independently or cooperatively to display information as generally contemplated herein.

A display for a printer as generally described above may provide a wide range of useful information to a user of a printer, such as any information relating to operation of the printer or information directed to a specific or general user of the printer.

For example, the display may present information including diagnostic information for the three-dimensional printer such as any information for calibration or information characterizing proper or improper functioning of the three-dimensional printer or its various components. The information may also or instead include status information for the three-dimensional printer. For example, status information may include one or more of an x position, a y position, a z position, or an extrusion temperature of a tool or other component movable within the working volume. The status information may include a temperature of the working volume, a temperature of a build platform, a temperature of an object being fabricated by the three-dimensional printer, or an ambient temperature outside an enclosure for the three-dimensional printer or within the working volume. The status information may also or instead include any information or data relating to a build executing on the three-dimensional printer such as a percentage completion, a time to completion, a material type, an amount of build material remaining in a supply, a current material cost for a current state of fabrication, an expected material cost for a completed fabrication, and so forth.

In another aspect, the display may present registration marks for calibration. These marks may be used, for example, to manually calibrate x position, y position, and/or z position of a tool for the three-dimensional printer. In another aspect where the three-dimensional printer includes a camera or the like, registration marks may be displayed and captured by the camera for use in an automated calibration procedure. In another aspect, the registration marks may be used for calibration of the camera, such as to determine a position and orientation of the camera relative to a working volume. Thus for example, a horizontal build platform may display a variety of machine-recognizable features, which may be imaged by the camera and used to determine a position of the build platform relative to the camera, or a position of a camera relative to the build platform. Similarly, the registration marks may be used for calibration of a three-dimensional scanner, machine vision system, or other device coupled to the three-dimensional printer.

The registration marks may also or instead be used for a variety of two-dimensional or three-dimensional processing tasks. For example, the registration marks may be used as a reference for measuring objects within a field of view, to detect edges of an object, to locate occlusions of a camera or scanner view, to mechanically center or position a movable camera, to identify an expected starting or stopping point for an extrusion process, or for any other process that might be augmented with a display of marks, patterns, or the like on a plane adjacent to or within a build volume.

In another aspect, the display may provide a rendering of an object being fabricated by the three-dimensional printer. For example, this may include a two-dimensional rendering of a digital model of the object, a silhouette of the object, an outline of the object, or any other rendering that permits visual comparison of the physical object to a digital model therefore.

Other information may also or instead be usefully provided in visual form on the display. For example, the information may include a representation of temperature for one or more regions of the build platform. Thus where the build platform is instrumented to detect local temperatures, or where an infrared camera or other spatial heat detection system can provide data, a thermal map of the build platform may be created, and corresponding colors may be displayed, such as on a vertical display on or behind the build platform, or projected directly on to the build platform using any suitable projector(s).

In another aspect, the information may include media synchronized to a fabrication of an object by the three-dimensional printer. This may without limitation include any suitable synchronized video or the like, as well as accompanying media such as music or narration providing information about the object, including uses for the object, a history of the object, information about an author of the object, and so forth. The information may also or instead include computer-generated images. For example, this may include visualizations such as a simulation of a tool path in two dimensions (i.e., for a current layer) or three-dimensions, which may be synchronized to a current print. In another aspect, this may include fanciful visualizations triggered, e.g., by sounds from printer motors or other hardware, or controlled by x-y-z positioning control signals or the like.

In another aspect, the display may present an advertisement. The advertisement may be selected for example based upon an object that is being currently fabricated by the three-dimensional printer, and may relate for example to other, related objects that can be fabricated, an author or publisher of a digital model for the object and the author's related works, and so forth. In another aspect, the advertisement may be selected based upon a history of printing activity for the three-dimensional printer, or based upon a history of printing activity for a user of the three-dimensional printer. The advertisement may also or instead be selected based upon one or more capabilities of the three-dimensional printer. The advertisement may be for various consumables such as build material suited to the printer. The advertisement may also or instead be targeted based upon the manufacturer or model of the printer, printer capabilities, a user profile, and so forth.

Other information may also or instead be presented, such as a user notification of a three-dimensional model that is available for download. For example, where a content publisher provides syndicated publication or the like, a user may subscribe to a source from the publisher. When a new item of content is published meeting one or more user-selected criteria, a corresponding notice may be displayed on the display for viewing at the printer. As another example, a user history of printing activity may be monitored, and a notification may be sent to the printer for display when a new item of potential interest is identified, either by a search from the printer or by a remote print server or other web-based print management tool. Similarly, a user may define one or more filters or criteria of interest, and responsive items may be displayed on the display when they become available.

The information may relate to software for the three-dimensional printer. For example, this may include a firmware update available for the three-dimensional printer, a software update available for a device associated with the three-dimensional printer, or a website containing information related to the three-dimensional printer. The website may, e.g., contain software for three-dimensional printing, three-dimensional modeling, and so forth, which may be software specifically created for the three-dimensional printer or software generally applicable to three-dimensional printing, modeling, or other tasks associated with a user of the three-dimensional printer. The website may also or instead contain other relevant information such as sources of material for purchase, models for fabrication, and so forth.

The information may include images captured by a camera and related to a current print job. For example, this may include current images from a camera or other imaging device coupled to the printer. This may, for example, include a top view of an object, or a birds-eye view from a tool head of the printer. This may also or instead include a thermal image of an object being fabricated or related hardware such as a build platform, tool head, or the like. In another aspect, the image(s) may include animations or slide shows of previously completed prints of an object, either by the printer that is displaying the images, or by other users and/or remote printers.

The information may include a user interface for operating the printer. This may, for example, include various menus and so forth, which may be accessed, e.g., from a keypad or buttons on the printer, or with a mouse or the like coupled to the printer, or to a computer or other device that is locally connected to the printer. This may include menus for printer configuration, printer utilities (calibration, load or unload build material, etc.), print selection, print queue management, and so forth.

The information may also be related to current usage of a printer in a variety of ways. For example, where a printer is inactive for a predetermined period of time, or where a printer is active with a print job and not available for other interaction, a screen saver may be presented. Similarly In one aspect, the information may include social network information. This may, for example, include printable objects of potential interest to a user based upon, e.g., the user's social graph and an object that is currently being printed. This may also include social information related to an object that is selected for printing or currently being printed. For example, the display may show "likes", "shares", "followers", or any other indications of interest in an object or an author of an object by other users. Similarly, this may include ratings, rankings, or other individual or aggregated user feedback, as well as individual comments and the like available through a social network or other online resource relating to three-dimensional fabrication. Similarly, the information may include feedback specific to the user. For example, the feedback may include badges, trophies, or other similar awards or notifications related to a user's printing activity. More specific acknowledgements may be provided, such as "Congrats! This is your $100^{th}$ print!" Similarly, information such as recommended print settings, assembly instructions, or the like that is available for an object may be retrieved from a social media site and displayed on the display. The display may more specifically show a web page or other web content from a social media site that hosts the object being fabricated. Such a web page may include the various types of information described herein, and may be tailored to particular user where the user is a registered user of the social media site.

In one aspect, a social network for printing may aggregate printability statistics based upon detection of completed builds and rank models, e.g., as easy, medium and hard, or using any other categories, rankings, or score to indicate printability, which information may be presented on the display during a print, or before the print is initiated. Additional flow control may be added. For example, the display may show text such as "This model is nearly impossible to print based upon user feedback. Are you sure you want to proceed?" Similarly, the social network may aggregate useful metadata which may also be helpful. For example, the display may show text such as "This object is most successful when using 'medium' quality print settings," or "This object is most successful when using 0.1 mm layer height. Would you like to change the default settings for this print?" More generally, any useful information that can be obtained from user-created rankings/commentary, or from an automated analysis or evaluation of prints of an object, might be used to generate helpful text that can be displayed as information to a user on the displays described herein. In this context, feedback may be specific to a particular type of machine so that relevant feedback can be more closely tailored to a user who is receiving the displayed information.

A social network may in general include a network hosted by a social website dedicated to three-dimensional printing, where data such as rankings, statistic, printability data, and the like may be aggregated for various users. A social network may also or instead include any other social network that permits creation of explicit social links (people that are liked, people that are followed (e.g., for commentary), people that are known, and so forth) or explicit assertions of identity through which users of three-dimensional printers can share or exchange information, any of which may provide or extend a social graph for operators of three-dimensional printers in a manner that permits inferences about social relationships, professional relationships, affinity groups, likes and dislikes, and so forth. Social network information may include any such relationships and/or any information shared through such relationships.

In another aspect, there is disclosed herein a method that includes aggregating printability information through a social network and displaying the printability information to a user who is viewing or has selected an object or model for fabrication on a three-dimensional printer. This may include automated aggregation, such as through detecting completion of builds of an object by members of the social network. The feedback may include print metadata such as printer type, print settings, and so forth. This may also or instead include aggregation of user-created feedback, rankings, evaluations, and the like. The information displayed may include any such social network information. For example this may include a ranking such as any of the scores, evaluations, ranking categories, or the like described above. The information may include a printability statistic for the object, which may for example be based on aggregated success rates or the like from other users in the social network. The information may include recommended print settings or other comments provided through a social network site. The information may also or instead include user-specific feedback for the object such as the congratulatory messages described above.

In another aspect, the display may present information including descriptive information for an object being fabricated such as a title, author/creator, source and the like. Other descriptive information may include any narrative or text relating to the object, a thumbnail or other image of the object, and so forth. Where the object is a part of a multi-part object, the information may include a depiction of the entire multi-part object, e.g., with the current object highlighted, or the information may include a depiction of a next object to be printed for the multi-part object.

In another aspect, the printer may include an integrated payment processor, and the display may provide an interface for processing payments. This may be particularly useful where, for example, the printer is located at a retail site where users operate the printer on a time, material, or other pay-as-you-go basis.

It will be appreciated that the various types of information described above may also or instead be displayed on a computer or other resource locally coupled to the printer. Thus, various user interfaces and features are further contemplated independent of the positioning of a display that is used to present the information. All such variations are intended to fall within the scope of this disclosure.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A device comprising:
    a three-dimensional printer having a working volume and an enclosure for the working volume;
    a computing device positioned within the enclosure and removably and replaceably coupled to the three-dimensional printer for use of the computing device as a build platform within the working volume, the computing device including a display having a display surface facing the working volume and horizontally oriented such that the display surface forms a build surface of the build platform, wherein the display is visible through the working volume from a location outside of the working volume;
    a processor configured to present information on the display related to operation of the three-dimensional printer; and
    a panel on the enclosure, the panel having an opening for visual access to the working volume, wherein the display is positioned within the enclosure and oriented so that the display surface is visible through the opening in the panel.

2. The device of claim 1 wherein the information includes diagnostic information for the three-dimensional printer.

3. The device of claim 1 wherein the information includes status information for the three-dimensional printer.

4. The device of claim 3 wherein the status information includes one or more of an x position, a y position, a z position, an extrusion temperature, a temperature of a working volume, a temperature of a build platform, a temperature of an object being fabricated, and an ambient temperature.

5. The device of claim 3 wherein the status information includes data for a build executing on the three-dimensional printer.

6. The device of claim 1 wherein the information includes registration marks for calibration.

7. The device of claim 6 wherein the information includes registration marks for calibration of a camera coupled to the three-dimensional printer.

8. The device of claim 6 wherein the information includes registration marks for calibration of a three-dimensional scanner coupled to the three-dimensional printer.

9. The device of claim 6 wherein the information includes registration marks for alignment of an x-y-z positioning assembly.

10. The device of claim 1 wherein the information includes a rendering of an object being fabricated by the three-dimensional printer.

11. The device of claim 1 wherein the information includes a representation of temperature for one or more regions of a build platform.

12. The device of claim 10 wherein the rendering includes a two-dimensional rendering of a digital three-dimensional model of the object.

13. The device of claim 10 wherein the rendering includes a silhouette of the object.

14. The device of claim 10 wherein the rendering includes an outline of the object.

15. The device of claim 1 wherein the information includes descriptive information for an object being fabricated by the three-dimensional printer.

16. The device of claim 1 wherein the information includes media synchronized to a fabrication of an object by the three-dimensional printer.

17. The device of claim 1 wherein the information includes an advertisement.

18. The device of claim 17 wherein the advertisement is selected based upon an object being fabricated by the three-dimensional printer.

19. The device of claim 17 wherein the advertisement is selected based upon a history of printing activity for the three-dimensional printer.

20. The device of claim 17 wherein the advertisement is selected based upon a user of the three-dimensional printer.

21. The device of claim 17 wherein the advertisement is selected based upon one or more capabilities of the three-dimensional printer.

22. The device of claim 1 wherein the information includes a user notification of a three-dimensional model available for download.

23. The device of claim 22 wherein the three-dimensional model is published by a source subscribed to by the processor.

24. The device of claim 22 wherein the three-dimensional model is selected based upon user activity for the three-dimensional printer.

25. The device of claim 1 wherein the information includes one or more of a firmware update available for the three-dimensional printer, a software update available for a device associated with the three-dimensional printer, and a website containing information related to the three-dimensional printer.

26. The device of claim 1 wherein the information includes social network information for an object selected for fabrication with the three-dimensional printer.

27. The device of claim 26 wherein the information includes a ranking for the object.

28. The device of claim 26 wherein the information includes a printability statistic for the object.

29. The device of claim 26 wherein the information includes recommended print settings for the object.

30. The device of claim 26 wherein the information includes user-specific feedback for the object.

* * * * *